United States Patent [19]

Fleischmann

[11] Patent Number: 4,478,249

[45] Date of Patent: Oct. 23, 1984

[54] FLUID CONTROL VALVE

[75] Inventor: Gary A. Fleischmann, Sheboygan, Wis.

[73] Assignee: Kohler Co., Kohler, Wis.

[21] Appl. No.: 577,722

[22] Filed: Feb. 6, 1984

Related U.S. Application Data

[63] Continuation of Ser. No. 311,519, Oct. 15, 1981, abandoned.

[51] Int. Cl.³ ............................................. F16K 11/06
[52] U.S. Cl. .............................. 137/625.4; 137/636.4; 137/454.6; 251/259
[58] Field of Search ................ 137/625.4, 625.17, 359, 137/454.6, 636.3, 636.4, 597; 251/56, 224, 259; 74/110, 567, 569

[56] References Cited

U.S. PATENT DOCUMENTS

| Re. 27,036 | 1/1971 | Miller . | |
|---|---|---|---|
| 2,076,840 | 4/1937 | Heggem | 251/164 |
| 2,980,130 | 4/1961 | Harke . | |
| 3,459,207 | 8/1969 | Bachelor | 137/597 |
| 3,533,436 | 10/1970 | Parkisen . | |
| 3,646,966 | 3/1972 | Smart . | |
| 3,704,728 | 12/1972 | Huneké | 137/625.4 X |
| 3,805,842 | 4/1974 | Thompson et al. . | |
| 3,854,493 | 12/1974 | Farrell . | |
| 3,882,897 | 5/1975 | Manoogian et al. . | |
| 4,088,153 | 5/1978 | Paasikivi . | |
| 4,130,136 | 12/1978 | Garnier et al. . | |
| 4,163,460 | 8/1979 | Zucchetti . | |
| 4,226,260 | 10/1980 | Schmitt . | |

Primary Examiner—Martin P. Schwadron
Assistant Examiner—Stephen M. Hepperle
Attorney, Agent, or Firm—Quarles & Brady

[57] ABSTRACT

A valve for controlling fluid flow is disclosed. In one embodiment, there is a valve housing which has a mixing chamber therein, first and second valve seats in the bottom of the chamber that are laterally spaced from one another to provide inlet openings connected to the chamber, and an outlet opening exiting from the chamber. A valve member is positioned in the chamber, the valve member having a lower sealing surface in slideable contact with the valve seats, porting means controlling the flow of water from the inlet openings to the outlet, and an aperture which is open at the upper surface of the valve member. A bearing member is mounted over the valve member, the bearing member having an axial bore. The upper stem section of an actuator is rotatably and axially movably mounted in the bore, and a lower cam section of the actuator is slideably extended into the valve member aperture. In this embodiment, axial movement of the actuator stem section causes the actuator cam to abut against a wall of the valve member aperture, thereby causing the valve member to slide laterally over the valve seats and control fluid volume. Rotation of the stem section causes the valve member to rotate, thereby controlling the proportion of fluids entering from each inlet opening.

2 Claims, 17 Drawing Figures

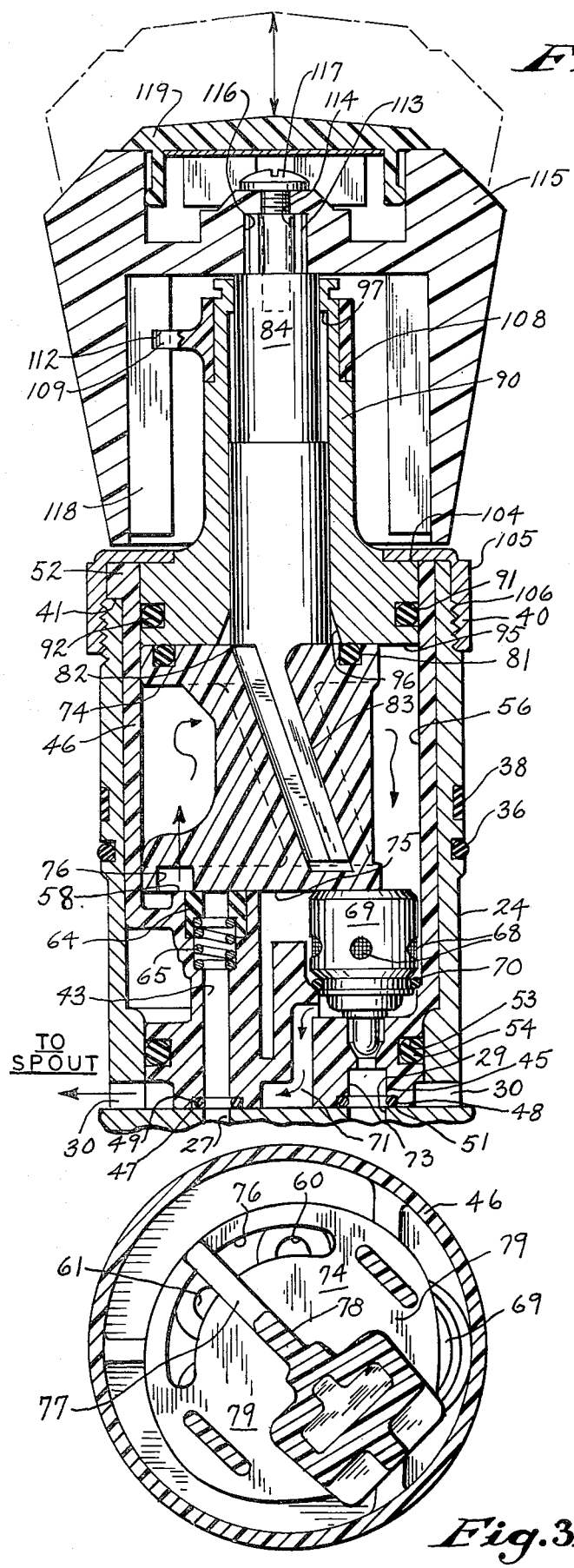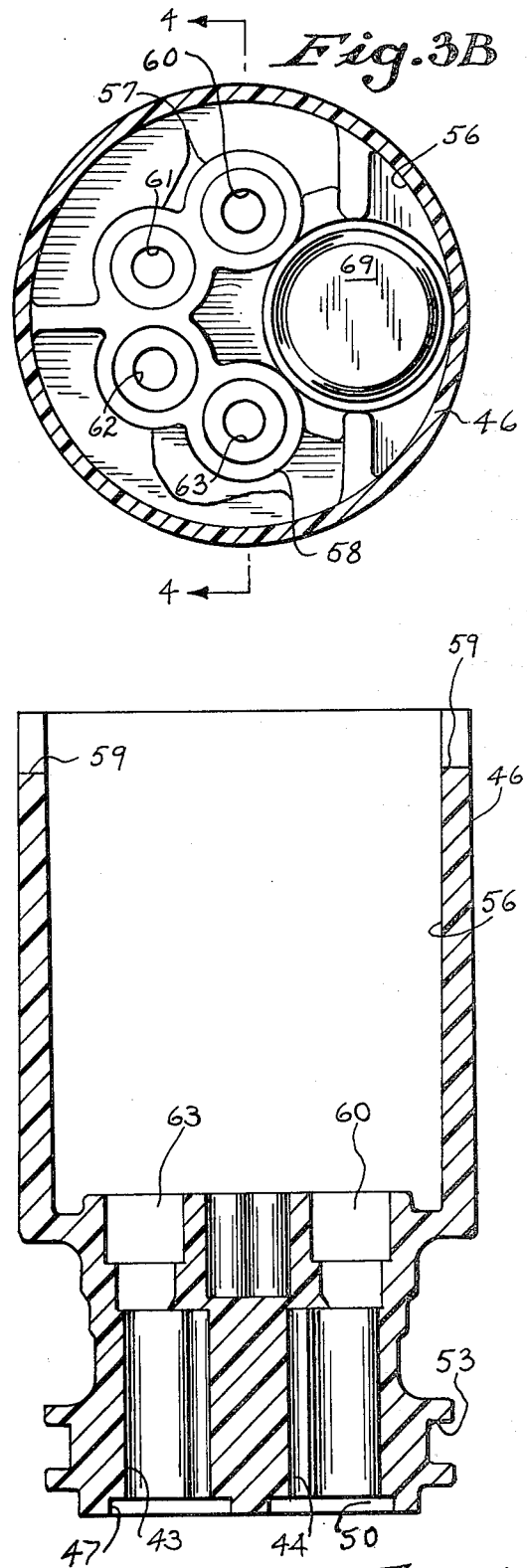

FLUID CONTROL VALVE

This application is a continuation of application Ser. No. 311,519 filed Oct. 15, 1981 now abandoned.

BACKGROUND OF THE INVENTION

1. Field of the Invention

The present invention relates to fluid mixing valves as may be used for controlling the volume and proportioning of flow through hot and cold water faucets.

2. Description of the Art

Mixing valves for governing the volume and temperature from separate hot and cold water inlets through the manipulation of a single control handle have been the subject of extensive design and innovation. Some operate the control handle from side to side to control temperature, and forward and backward to control volume. Other designs rotate the control handle to govern temperature, and have a push-pull movement to govern volume. Internally, the valve structures may open and close hot and cold ports by sliding and rotating a cylinder, or by causing a sleeve-shaped flexible valve toward and away from inlet ports, or turning cylindrical balls, or sliding an appropriately apertured disc across inlet ports in a composite sideward and rotational movement.

A type of sliding disc valve which has gained some acceptance relies on a lever actuator mechanism in which the lever is universally mounted medially of its ends in a bearing member above the sliding disc. One end of the lever extends outwardly from the bearing to be grasped by a user, and the other end of the lever extends inwardly from the bearing into engagement with the top of the valve disc. A swinging motion of the top part of the lever pivots the lower part of the lever on the bearing, thereby moving the sliding disk over hot and cold water inlets. In order to provide the lever mounting, such valves often use pin connections between the lever arm and bearing, or use a spherical ball on the lever arm and a spherical seat for the ball. Examples of this type of valve are described in U.S. Pat. No. Re. 27,036 which issued on Jan. 19, 1971 to L. J. Miller, and U.S. Pat. No. 3,854,493 which issued on Dec. 17, 1974 to G. J. Farrell.

However, valves of this type are not without problems. They are mechanically complex and the bearings may tend to loosen and become imprecise in operation. Some valves of this type are noisy due to abrupt opening or closing of the valve. Also, other such valves will from time to time cause discomfort to users due to the inability of the user to prevent abrupt changes in temperature when adjusting temperature of the fluid.

SUMMARY OF THE INVENTION

The present invention resides in an improved mixing valve for controlling fluid flow having a housing with a chamber therein, inlet valve seats along the bottom of the chamber, an outlet opening from the chamber, a sliding disc valve member within the chamber, an axially extending bearing above the valve member, an actuator with an upper stem section slidably and rotatably mounted in the bearing axial bore, and a lower, obliquely extending cam section in engagement with the valve member.

Upon axial movement of the actuator, the valve member is caused to slide linearly over the valve seats and by rotation of the actuator, the valve member correspondingly moves arcuately across the valve seats. The two movements control proportioning and volume of fluid flow to obtain full mixing control with a single handle.

The invention provides a valve structure which allows a user to make precise and gradual adjustments to volume and proportioning. The valve of the present invention is also fluid tight and wear resistant. Further, because of the cartridge-type structure attainable by the present invention, and the relatively low cost of production of the actuator and other cartridge parts, it is practical to repair a faucet incorporating the valve without a plumber's assistance by removing the cartridge as a unit, disposing of it, and replacing it with a new cartridge.

Another feature of the invention is the simplified structural relationship between the manual actuator and the sliding disc that opens and closes the fluid inlet ports opening upon the mixing chamber in which the sliding disc resides. The actuator has an operating end formed obliquely to its axis, and this end fits into a mating opening in the sliding disc. Upon axial movement of the actuator, the oblique end functions as a cam member that rides against the side wall of the mating disc opening to translate its axial motion into a sliding motion of the disc at right angles to said axial motion.

Upon rotation of the actuator, the distal portion of the oblique end rotates and carries the actuator in a like motion. Thus, a simplified, two-part construction provides full proportioning and volume control for a mixing valve.

In one preferred embodiment, the valve is part of a kitchen faucet. In this embodiment, four inlet openings in a plastic cartridge-type housing communicate with the mixing chamber through four arcuately spaced valve seats. The outlet opening exits from the chamber adjacent the valve seats, and a diverter unit is mounted in the outlet for directing water through a first exit passage in normal operation and through a second exit passage upon actuation of a kitchen spray unit. Thus, all the porting can be located beneath the sliding disc.

Objects of the invention include:

a. providing a fluid control valve which has a simplified single piece actuator that mates with a disc valve in a tenon and mortise connection;

b. providing a fluid control valve of the above kind which is contained in a unitary disposable cartridge;

c. providing a fluid control valve of the above kind which allows a user to make precise and gradual adjustments of volume and proportioning;

d. providing a fluid control valve of the above kind having a diverter unit inside a plastic valve cartridge; and e. providing a fluid control valve of the above kind and which is water-tight and wear resistant.

These and other objects and advantages of the invention will be apparent from the description which follows. In the description, preferred embodiments of the invention will be described in reference to the accompanying drawings. These embodiments do not represent the full scope of the invention, but rather the invention may be employed in other embodiments. Reference therefore should be made to the claims to interpret the breadth of the invention.

BRIEF DESCRIPTION OF THE DRAWINGS

FIG. 2B is a view similar to FIG. 2A, with the valve shown in its off position;

FIG. 3A is a sectional view taken along line 3A—3A in FIG. 2A after the valve handle has been rotated 45°, but with the outer barrel of the faucet removed to show only the cartridge portion of the valve;

FIG. 3B is a view taken along line 3B—3B in FIG. 2A, but again without the outer barrel of the faucet;

FIG. 4 is a sectional view taken along line 4—4 in FIG. 3B with springs, seals, and other internal components removed to show only the cartridge housing of the valve;

DESCRIPTION OF THE PREFERRED EMBODIMENTS

Figure 1:
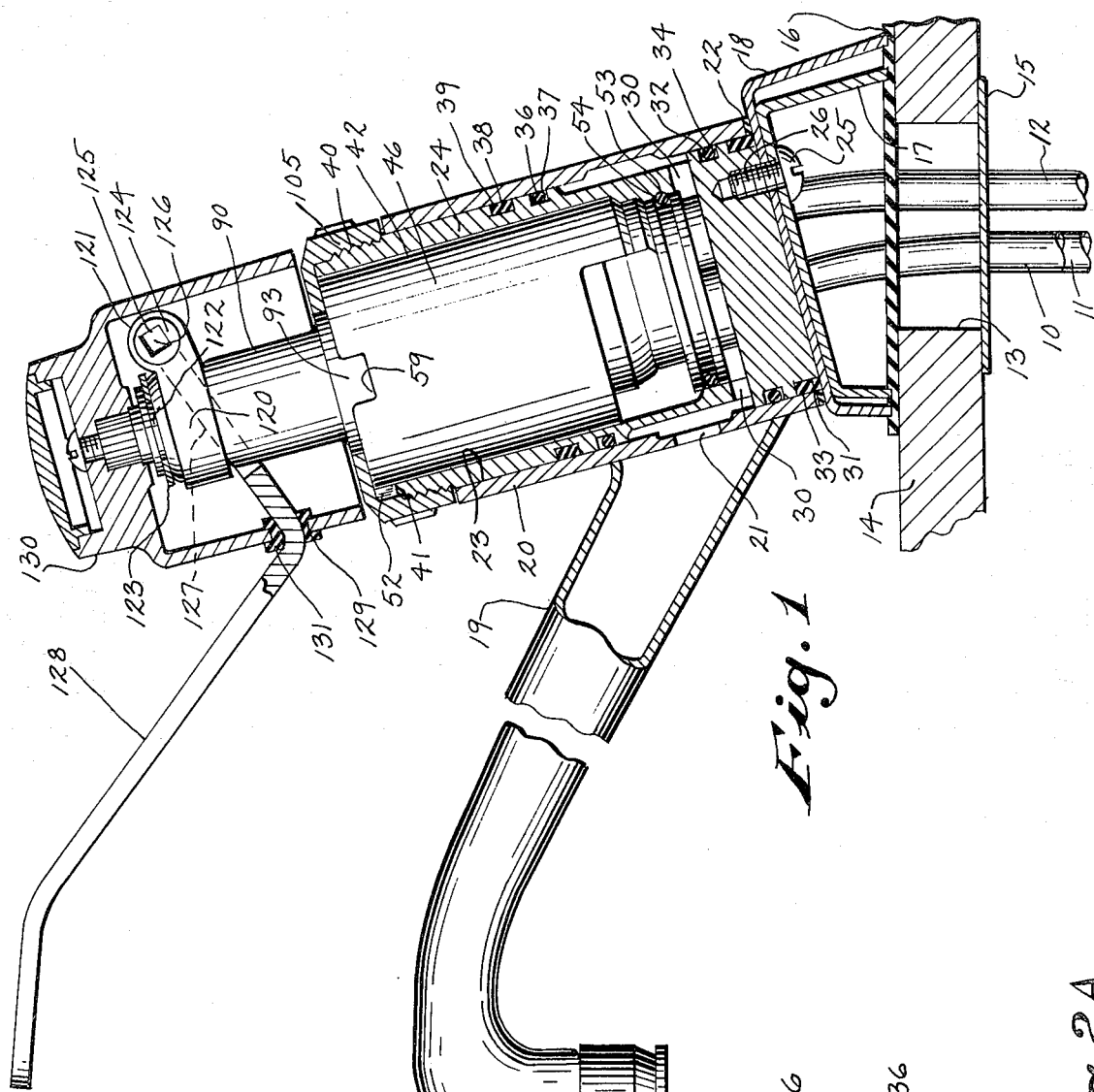
FIG. 1 is a view in partial section of an embodiment of the present invention mounted in a kitchen faucet assembly.

Referring now to FIG. 1 of the drawings, there is shown a hot water inlet pipe 10 and a cold water inlet pipe 11, both of which are attachable to plumbing supply lines (not shown). These pipes feed into the flow control valve of the present invention. There is also shown a spray outlet pipe 12 which extends outwardly from the valve, so as to be attachable to a conventional kitchen spray unit (also not shown). These three pipes pass through hole 13 in a kitchen counter top 14 and through suitable alignment and sealing gaskets 15 and 16.

Mounted on top of gasket 16 are an attachment escutcheon 17 and decorative escutcheon 18. The attachment escutcheon 17 may be rigidly affixed to the sink top 14 by passing a screw (not shown) through the attachment escutcheon 17 down into the sink top. The screw connection can then be covered with the decorative escutcheon 18.

Also shown in FIG. 1, there is a conventional metal faucet spout 19 having an integrally formed cylindrical hollow hub 20. The spout hub 20 has an aperture 21 which allows communication between the inside 23 of the hub 20 and the spout 19.

The spout hub 20 rests on plastic swivel ring 22 which is inserted between the bottom of the spout hub 20 and the top surface of decorative escutcheon 18 to reduce friction between them when the spout 19 is swiveled. Inside the interior bore 23 of the spout hub 20 is positioned a brass valve body 24. The brass valve body 24 can be mounted on the escutcheons 17 and 18 through the use of three screws 25 which screw up from under escutcheons 17 and 18 into threaded holes 26 in the bottom of the brass valve body 24. Also formed in the base of the brass valve body are a hot water passage 27 (FIG. 2B), a cold water passage (not shown) and a spray passage 29 to which the three pipes 10, 11 and 12 may be welded. These passages extend through the base of the valve body 24.

Formed in the sidewall of the brass valve body 24 are a plurality of spout outlet passages 30 which allow fluid to flow to the spout hub aperture 21. Also along the periphery of the brass valve body 24 are formed recesses 31, 34, 37 and 39 in which sit "O" rings 32 and 36 and plastic glide rings 33 and 38. Through the use of these rings, the interface between the brass valve body 24 and the spout hub 20 is sealed from leakage, while at the same time the spout 19 and the hub 20 are free to swivel around the outside of the brass valve body 24. Brass valve body 24 also has on its periphery threads 40 and a rectangular alignment pocket 41 near the top of the brass valve body.

Plastic cartridge housing 46, which is shown alone in FIG. 4, has a cylindrical diameter only slightly less than that of an interior cylindrical chamber 42 in brass valve body 24. Thus, it may be snugly inserted into the brass valve body chamber 42 so that valve body passages communicate at the bottom of the cartridge housing 46 with cartridge inlets 43 and 44, and outlet 45. Grooves 47, 48 and 50 are formed in the bottom of the cartridge adjacent the inlets 43 and 44 and the outlet 45. Three seals 49, 51 and one not shown are inserted and retained in these grooves, thereby sealing the interfaces between the passages in the brass valve body 24, and aligned passages 43, 44 and 45 in the bottom of the plastic cartridge.

On the upper periphery of the housing 46 there is a rectangular alignment projection 52 which sits in the pocket 41 near the top of the valve body 24. Also around the bottom periphery of the housing 46 is an "O" ring recess 53 which receives an "O" ring 54, thereby sealing the interface between the plastic valve housing 46 and the brass valve body 24.

The housing 46 also has a central mixing chamber 56, and four laterally and arcuately spaced valve seats. There are two cold water seats 57, and two hot water seats 58 (FIG. 3B) along the bottom of the mixing chamber 56. There are also slots 59 on opposed exterior sides of the top portion of the cartridge housing. The slots can be rectangular or slightly trapezoidal with the narrow end of the trapezoid at the top.

Cartridge inlets 43 and 44 each split into two inlet passages, thereby forming four valve seat inlets 60, 61, 62 and 63 which open into the mixing chamber. These inlets are sealed by four annular seals 64 which are mounted on springs 65, the spring mounted seals being seated in counter bores below the valve seats 57 and 58 (FIG. 2B). Adjacent the valve seats is a cylindrical outlet cavity 68 in which sits a diverter unit 69. O-ring 70 seals the interface between the diverter unit 69 and the lower walls of the cavity 68.

The operation of the diverter unit 69 is described in detail in U.S. Pat. No. 3,376,884. Thus, it is sufficient for the purposes of this application to indicate that in normal operation of the valve, water exiting from the mixing chamber in the direction of arrow 71 (see bottom part of FIG. 2B) will travel through the diverter and out outlet passages 30 in the brass valve body 24, and finally through the spout hub aperture 21 to the spout 19. Should a spray unit which is attached to spray pipe 12 be activitated, the diverter unit 69 will cause water to flow down passage 73 through spray pipe 12, and eventually to the spray unit.

Turning now to FIGS. 3A and 5A-D, a sliding disc-type valve member 74 of plastic material is shown which is suitable to be positioned in mixing chamber 56. The valve member has a lower sealing surface 75 which is in slideable contact with the valve seats 57 and 58. In the bottom of the valve member is formed a kidney shaped hole 76 which is divided into two halves by a support brace 77. Water entering from any of the four inlets 60, 61, 62 and 63 will pass through the kidney shaped opening 76 when it is aligned with the inlets, and mix together in the region between the interior sidewall of the plastic cartridge housing 46 and the recessed wall 78 in the plastic valve member 74. Water then may pass around the disc or through transverse passages 79 in the valve member 74.

Figure 5A:
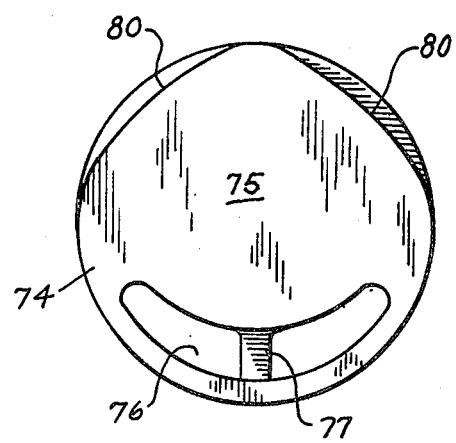
FIG. 5A is a bottom view of a sliding disc valve member forming part of the invention.

As best seen in FIG. 5A, there are two recesses 80 cut along the back bottom edge of the valve member. Water traveling through the transverse passages 79 or around the sides of the disc may pass downward past these recesses to reach the outlet cavity 68.

Thus, when the kidney shaped opening 76 is over the four inlets 60, 61, 62 and 63, the valve is fully open and water may pass through the valve member to the outlet cavity 68. If the valve member 74 is shifted transversely by sliding it across the valve seats 57, 58, the volume of flow through the valve can be controlled, or shut off entirely such as in FIG. 2B. By rotating the valve member 74, the kidney shaped opening can be rotated over one or both hot water inlets 60 and 61 and/or one or both cold water inlets 62 and 63 (FIG. 3A) thus regulating water temperature.

Figure 5B:
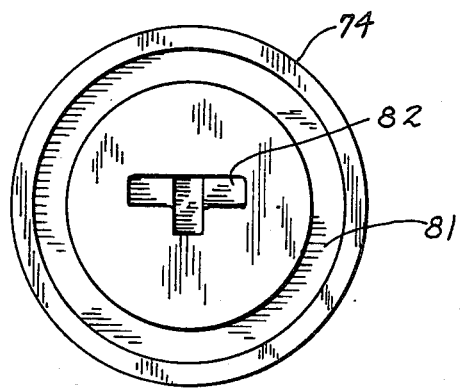
FIG. 5B is a top view of the sliding disc.
Figure 5C:
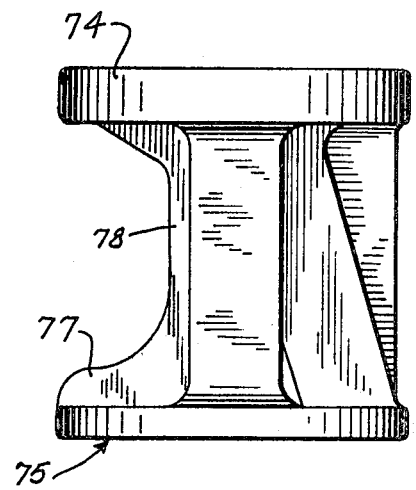
FIG. 5C is a side elevational view of the sliding disc.
Figure 5D:
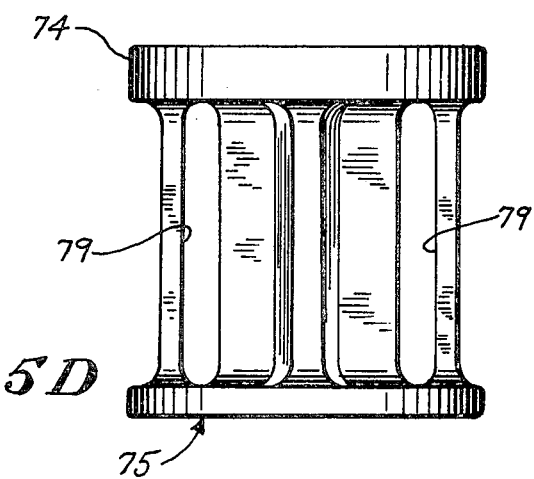
FIG. 5D is a rear elevational view of the sliding disc.

Referring now to FIG. 5B, at the top of the valve member 74 there is formed an annular groove 81 in which may be placed an "O" ring. The groove 81 (and the O ring in it) encircle a "t" shaped cam receiving aperture 82 which communicates with an obliquely extending bore 83 (FIG. 2A) having a substantially uniform t-shaped cross sectional configuration along its cam receiving length.

Figure 6A:
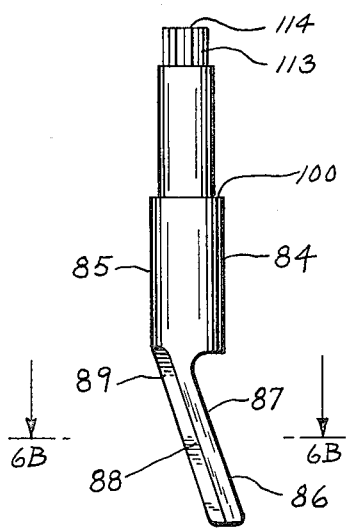
FIG. 6A is a view of a manual actuator member forming part of the invention.
Figure 7A:
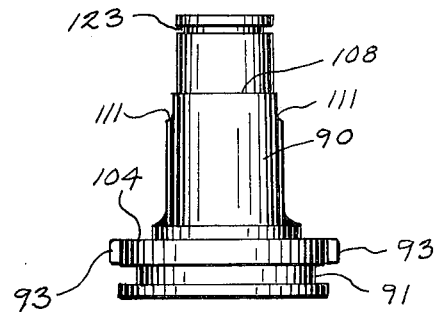
FIG. 7A is a side elevational view of a bearing member forming part of the construction.
Figure 6B:
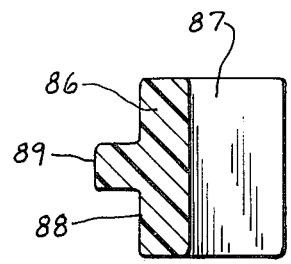
FIG. 6B is a sectional view taken along line 6B—6B in FIG. 6A.
Figure 7B:
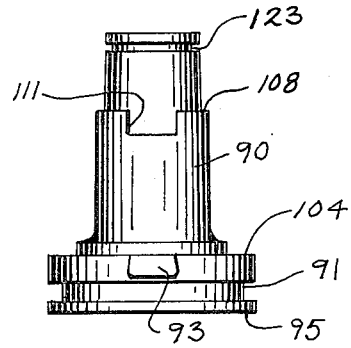
FIG. 7B is a front elevational view of the bearing member.
Figure 7C:
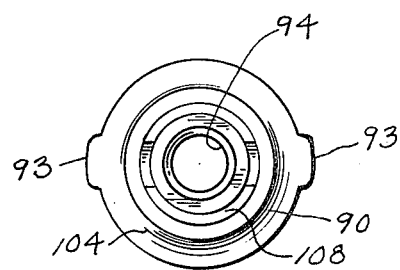
FIG. 7C is a top view of the bearing member.
Figure 8A:
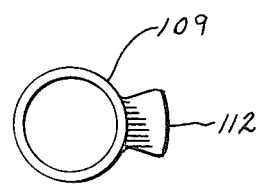
FIG. 8A is a top view of a handle stop forming part of the construction.
Figure 8B:
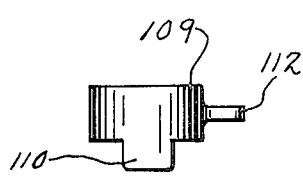
FIG. 8B is a side elevational view of the handle stop.

An elongated, shaft-like actuator 84 (FIGS. 6A and B) allows a user to control movement of the valve member 74 and make precise and gradual adjustments to the volume and proportioning of the valve. The actuator 84 has a stem section 85 with its axis directed towards the bottom of the chamber 56, and a cam section 86 projecting obliquely and downwardly from the stem section into the valve member aperture 82 and valve member bore 83. There are camming surfaces 87 and 88 along opposite sides of the actuator 84, and a projecting alignment rudder 89 along one camming surface. The cross section of the cam section 86 is t-shaped and of a slightly smaller size than the cross section of the aperture 82 and bore 83 to fit snugly therein with a sliding fit.

Rotational movement of the actuator 84 will cause the oblique cam section 86 to swing in an arc about the actuator axis and consequently the camming surfaces 87 and 88 and the rudder 89 contact the walls of the aperture 82 and bore 83 to cause the valve member 74 to rotate therewith. Axial movement of the stem 85, on the other hand, will cause the cam section 86 to be moved into or out of the bore 83, and as will more fully be described below thereby cause the valve member to move laterally across the valve seats 57 and 58 and bring the kidney shaped hole 76 in the valve member into and out of alignment with the inlets, so as to cover and uncover the inlets. Thus, the actuator 84 allows the user to control valve member movement in two basic directions of motion, one rotational and the other linear.

Referring now to FIGS. 2A, 2B and 7A-C, a bearing or closure member 90 is shown. On the periphery of the bearing is formed an "O" ring recess 91 for receiving "O" ring 92. Along the sides of the bearing member 90 are alignment projections 93. The bearing member also has an axial bore 94 which is at its widest near the flat bottom bearing surface 95 at point 96. The bore 94 then tapers to a narrower diameter which is only slightly larger than the diameter of the stem section 85 of the actuator 84, and then near its top narrows to form ledge 97.

Figure 2A:
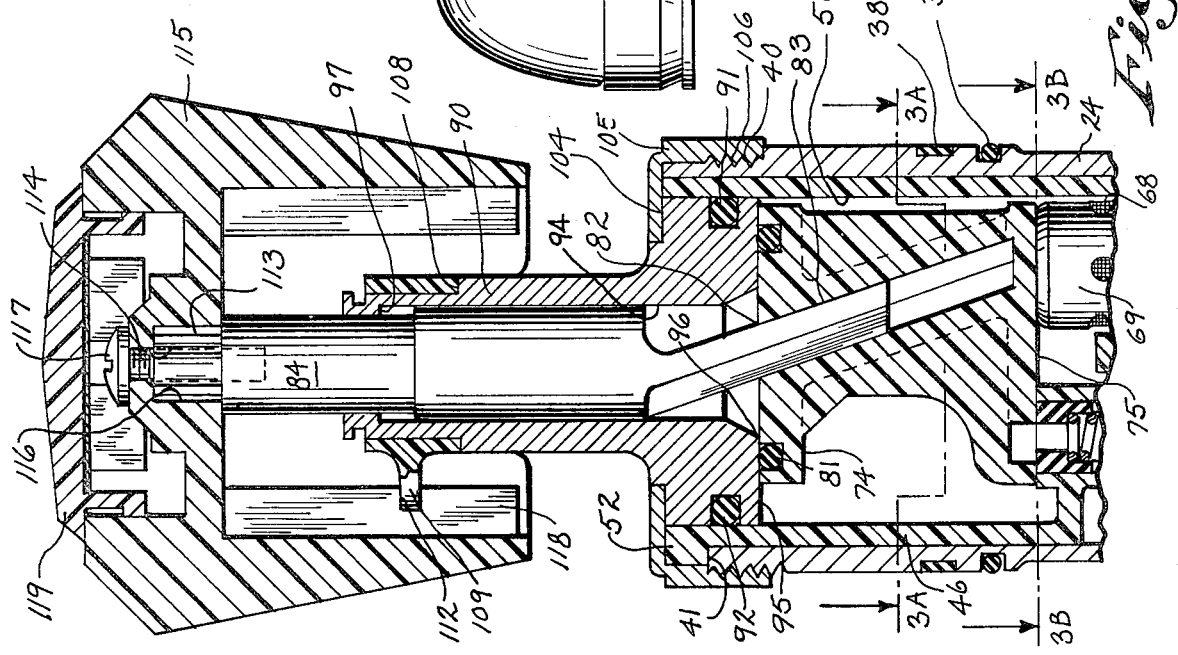
FIG. 2A is a partial longitudinal view in section of the faucet assembly of FIG. 1, with the outer hub mounting the spout removed, and with the lever handle of FIG. 1 replaced by a push-pull type handle to indicate different type faucets with which the invention may be used, such handle being raised to place the valve in its on position.

It will be appreciated that the actuator 84 may be slideably and rotatably mounted in the bore 94 with one end projecting through the top of the bearing, such that upward movement of the actuator is limited by the abutment of the top end 100 of the stem section of the actuator against ledge 97. Downward movement of the actuator can be limited as shown in FIG. 2A by the bottom of the stem section 84 contacting against the top of valve member 74 or alternatively by the bottom of handle 115 against the top of bearing 90. Thus, the actuator 84 may move up and down a fixed distance in the bearing member 90.

To assemble the valve cartridge, diverter unit 69, springs 65, and seals 64 and 70 are placed in the housing 46, and then the plastic valve member 74 is inserted in the mixing chamber 56. The cam section 86 of the plastic actuator 84 is then slid into the valve member aperture 82 and bore 83. Bearing member 90 is then mounted on the valve member 74 to complete the cartridge unit.

The "O" ring in annular groove 81 seals the interface between the top of the valve member 74 and the bearing surface 95. "O" ring 92 seals the interface between the plastic housing 46 and the sides of the bearing member 90. Bearing projections 93 on the sides of the bearing member 90 snap into recesses 59 on the housing to align the bearing member 90 and set its height relative to the valve member.

Above projections 93 on the bearing member 90, there is formed a ledge 104 on which may be placed a metal threaded bonnet 105. Threads 106 on the bonnet 105 are screwed into threads 40 on the exterior of the brass valve body 24. As can be seen in FIG. 1, this sandwiches the spout hub 20 between the bonnet 105 and swivel ring 22, and at the same time bonnet 105 acts to retain the valve cartridge in the brass valve body 24. Thus, if the bonnet 105 is unscrewed, the cartridge assembly can easily be removed by pulling the cartridge housing 46 upwardly out of the valve body 24. Another cartridge assembly can then easily be inserted in its place.

FIGS. 1, 2A, 2B, and 8A-B show two preferred handle assemblies which can be used with the present invention. In order to receive these assemblies, a second ledge 108 is formed on the exterior of the bearing member 90. In the embodiment shown in FIGS. 2A, 2B and 8A–B, a stop ring 109 is positioned on this ledge. Stop ring 109 is a cylindrical hollow ring having two rectangular tab-like feet 110 which snap into feet receiving wells 111 formed below ledge 108 on the periphery of the bearing member 90.

Once the stop ring 109 has been placed over the upper portion of the bearing member 90, it cannot rotate with respect to the bearing member 90 as feet 110 will abut against the walls of feet receiving wells 111. Further, downward axial movement of the stop ring 109 is prevented due to the contact between the stop ring 109 with the ledge 108 and with the feet receiving wells 111. Stop ring 109 also has a wing 112, which extends peripherally outward from the ring.

The actuator 84 is formed with a fluted end 113 having an axial threaded screw hole 114. A conventional push-pull handle 115 is mounted on the actuator 90, the handle having a fluted socket 116 for receiving and mating with the actuator fluted end 113. To connect the handle and actuator, an attachment screw 117 is brought down through a top wall of the handle 115 into the threaded hole 114. A decorative snap cap 119 covers the connection.

It will be appreciated that the actuator 84 will rotate with the handle 115 due to the mating of the fluted socket 116 with the fluted end 113 of the actuator 84. The bearing member 90, and thus the stop projection 112 do not rotate. As such, vertical stop walls 118 on the interior of the handle 115 limit the rotation of the handle 115 around the bearing member 90 and thus temperature extremes because wing 112 will abut against such walls 118 at fixed points in the rotation.

When the handle 115 is pulled upwardly from the position of FIG. 2B to that of 2A, the actuator 84 will be pulled axially upward due to the screw connection. As the cam section 86 of the actuator 84 begins to pull out of the valve member bore 83, the cam section abuts against a wall of the aperture 82 and/or bore 83, thus causing a lateral force on the valve member 74. In response to this force, the valve member 74 slides laterally between the bearing surface 95 on the bearing member 90 and the valve seats 57 and 58. This process is reversed when the handle is pushed downward.

The other preferred handle embodiment is shown in FIG. 1. In place of the stop ring 109, a lever collar 120 is used. The collar has a cylindrical ring section which is similar to that of the stop ring 109, but instead of the wing 112 it has a cylindrical transverse bushing retainer 121. Lever collar 120 sits on ledge 108, and is held in place against upward movement by a thin metal snap ring 122 which fits in recess 123 in the upper periphery of the bearing member 90. Thus, the lever collar 120 is free to rotate on the bearing member 90, but is vertically fixed as it is sandwiched between the snap ring 122 and ledge 108.

A cylindrical bushing 124 fits in the bushing retainer 121, the bushing having a cubic interior bore 125 into which fits a square extension 126 from a metal lever arm 128. The metal lever arm 128 has a curved section 127 which extends around the outside of the bearing member 90 and then through an opening 129 in the handle 130 to connect the exterior arm with the bushing 124. Also, a grommet fulcrum 131 is provided in the opening 129. The handle 130 is attached to the top of the actuator in a manner similar to that shown in FIG. 2A.

While this handle assembly could be actuated by a simple pulling of a handle 130 upward, and/or by rotating the handle 130 in a manner similar to the way in which the handle shown in FIG. 2A is usable, the user can also raise the lever arm 128, to force handle 130 upward. By swinging the lever arm 128, the handle 130 can be made to rotate.

In sum, then, the present invention provides a flow control valve having a unitary cartridge structure. The valve can easily be inserted into a permanent faucet structure and replaced should any elements of the cartridge wear. The elements of the cartridge other than the rubber seals, the spring and the metal diverter are easily molded from plastic, and thus the cartridge can be produced inexpensively.

Because of the relatively large axial length of the bores 83 and 94, the axial push-pull operation of the valve, the tapering of bearing bore 94 at point 96, and the providing of four laterally spaced inlets, very gradual and precise volume adjustments can be made. Thus, the user is less likely to experience a sudden rush of water upon turning the valve on, or a banging of the pipes upon a sudden shut off. Similarly, precise temperature control can be achieved due to the wide arc of permitted rotation of the valve member 74, and the providing of four arcuately spaced inlets, two for hot water and two for cold. The valve thus lowers the risk of a user experiencing an abrupt change of temperature.

Further, the invention provides a sliding disc-type construction in which the two principal directions of disc movement are controlled through a single handle, wherein the intermediary control parts between the handle and disc comprise a single rod with an oblique end engaging the disc in a unique tenon and mortise connection, that translates motion from one part to another.

It will be appreciated that in addition to the embodiments shown, the basic concept of the invention can appear in other embodiments. For example, rather than using the valve in a kitchen faucet, the valve could be used to control the flow of a single or multiple lines of many types of fluids.

Also, while the especially preferred embodiment incorporates a diverter unit and spray outlet structure, these features need not be used with every embodiment. A cartridge without a diverter would have a reduced overall length and could be especially useful as a bathroom faucet valve or as a kitchen faucet valve if a spray is not desired.

Thus, there may be various modifications and changes in the embodiments which have been shown which are within the scope of the invention. Such modifications and changes are meant to be within the scope of the invention and as such the invention is not to be limited by the illustrative description above.

I claim:

1. A fluid proportioning valve, comprising:
    a housing having a mixing chamber therein, first and second valve seats in the bottom of the mixing chamber that are laterally spaced from one another to provide inlet openings communicating with said chamber, and an outlet opening exiting from said chamber;
    a valve member in said chamber having a lower sealing surface in slideable contact with said valve seats, porting means controlling the flow of water from said inlet openings to said outlet opening, and an aperture which is open at the upper surface of the valve member;
    said porting means comprising a kidney shaped hole in the bottom of said valve member, a transverse passage through said valve member, and a recess cut along the back bottom edge of said valve member, whereby upon appropriate positioning of the valve member, fluid may pass through said kidney shaped hole, through said transverse passage, and past said recess to reach the outlet;

a bearing member mounted over said valve member which has an axial bore; and an actuator having an upper stem section rotatably and axially movable in said bore and a lower cam section slideably extending into said valve member aperture, whereby axial movement of the stem section causes the cam to contact a wall of said aperture, thereby causing the valve member to slide laterally over said valve seats to control fluid volume, and rotation of said stem section causes said valve member to rotate, thereby controlling the proportion of fluid entering from each inlet opening.

2. A fluid proportioning valve, comprising:

a housing having a mixing chamber therein, first and second valve seats in the bottom of the mixing chamber that are laterally spaced from one another to provide inlet openings communicating with said chamber, and an outlet opening exiting from said chamber;

a valve member in said chamber having a lower sealing surface in slideable contact with said valve seats, porting means controlling the flow of water from said inlet openings to said outlet opening, and an aperture which is open at the upper surface of the valve member;

said porting means comprising a hole in the bottom of said valve member, a transverse passage through said valve member, and a transverse passage exit cut along a back bottom edge of said valve member, whereby upon appropriate positioning of the valve member, fluid may pass through the hole, through said transverse passage, and past said transverse passage exit to reach the outlet;

a bearing member mounted over said valve member which has an axial bore; and an actuator having an upper stem section rotatably and axially movable in said bore and a lower cam section slideably extending into said valve member aperture, whereby axial movement of the stem section causes the cam to contact a wall of said aperture, thereby causing the valve member to slide laterally over said valve seats to control fluid volume, and rotation of said stem section causes said valve member to rotate, thereby controlling the proportion of fluid entering from each inlet opening.

* * * * *